Patented July 1, 1952

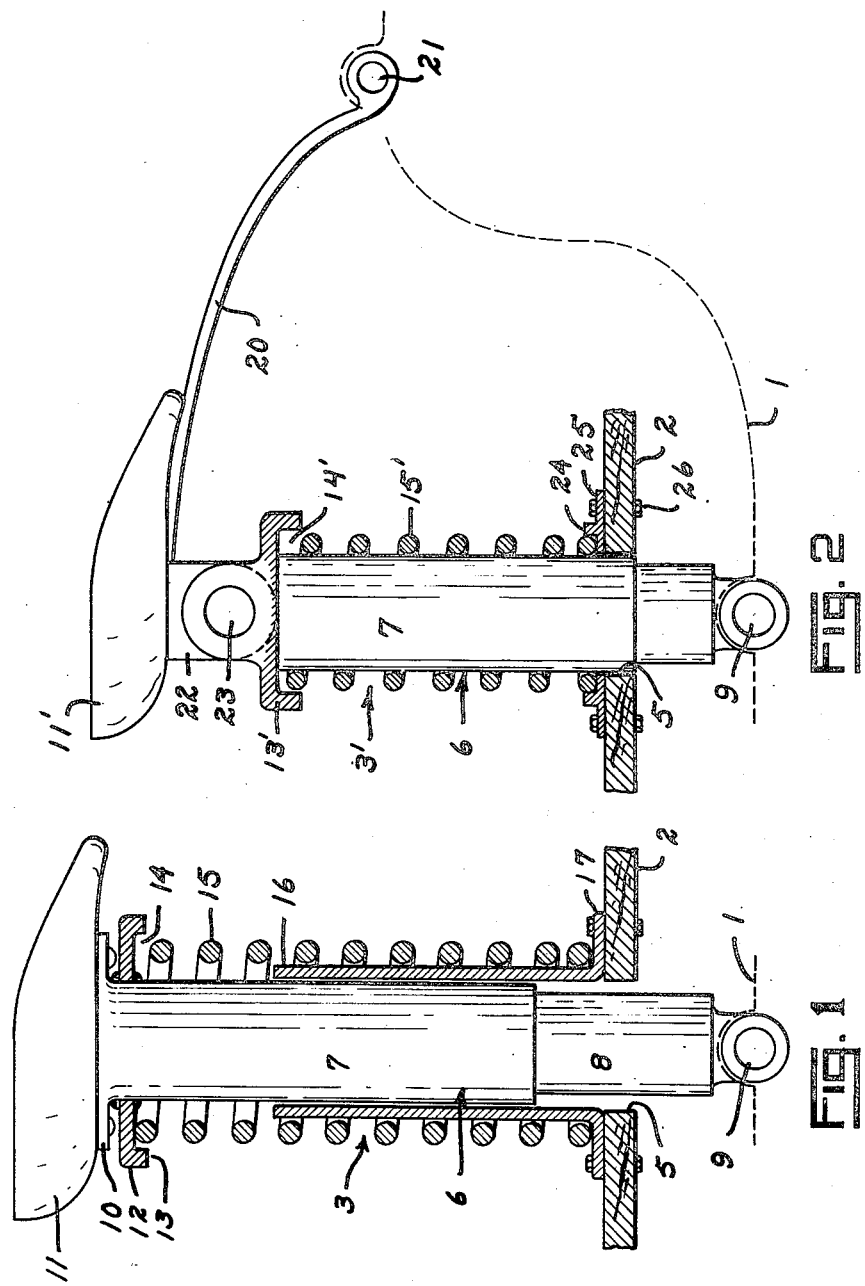

2,601,886

UNITED STATES PATENT OFFICE 2,601,886

RESILIENTLY MOUNTED VEHICLE SEAT

John Randolph, Mexia, Tex.

Application May 15, 1945, Serial No. 593,925

5 Claims. (Cl. 155—51)

This invention relates to a support mechanism for a seat mounted upon vehicles subjected to severe impacts or jolts, and more particularly to a seat of this type providing maximum comfort and safety.

On vehicles which are subjected to rough terrain, such as trucks, tractors, and the like, efforts have been made to provide a seat which enables the driver or other occupant of the vehicle to ride in a seated position in comfort and with safety by providing a spring support for the seat. Where such support has been sufficiently resilient to permit desired relative movement of the seat and the vehicle upon impact, difficulty arises from the subsequent recoil throwing the occupant clear of the seat. If, on the other hand, the support is made sufficiently rigid to reduce this difficulty to a desirable extent, then both comfort and safety are jeopardized. In particular is safety jeopardized in event the vehicle overturns and the occupant is pinned against the seat provided with a relatively rigid support. In order to minimize these difficulties and to provide a high degree of comfort for the operator and/or other occupants of the vehicle, the present invention has been evolved.

It is the primary object of the invention to provide a resilient seat support for tractors and the like, together with means for controlling the recoil movement of the seat after it has moved resiliently downwardly.

Another object is to provide a resilient seat support which is so constructed that it may utilize, as an element thereof, conventional shock absorbers.

Still another object is to provide a resilient seat support that is simple and efficient and which may be embodied in new equipment or may be readily installed upon existing equipment.

A still further object is to provide a resilient seat support comprising a coil spring for resiliently controlling the relative movement of the seat toward the vehicle, and cooperating shock absorbing or snubber means for controlling the succeeding recoil of the seat assembly.

Another and more specific object of the invention is to provide coaxially arranged support spring and shock absorber.

Still another object is to provide in one form of the invention a guide pillar through which the absorber mechanism extends so that a telescoping member of the absorber mechanism, to which the seat is secured, is guided in its movements by the guide pillar.

The foregoing objects together with other objects and advantages of the invention will be more fully apparent from the following description considered in connection with the accompanying drawings in which:

Fig. 1 is a side elevational view of one embodiment of the invention, parts being shown in section to more clearly illustrate the construction;

Fig. 2 is a view similar to that shown in Fig. 1, but illustrating an alternative form of the invention.

In the illustrated embodiments of the invention the framework of the vehicle upon which the device is mounted is shown at 1, the vehicle also including a platform 2 upon which the operator may stand to carry out operational activities, and upon which the support mechanism 3 of the invention is mounted.

The upper section 7 of the absorber mechanism is provided with a flange 10 to which the seat 11 is secured. A disk 12 also surrounds and is secured to the section 7 proximate its upper end, and has an annular flange 13 at its outer edge. This provides a recess 14 which receives the upper end of compression spring 15 which has a sufficient internal diameter to fit about the upstanding pillar 16 having flange 17 at its lower end for securement to the platform 2 about the opening 5. The lower end of this spring engages the upper surface of the flange 17. The lower section 8 of the absorber mechanism is provided with a suitable configuration to make a pivot connection 9 with the frame 1.

It seems apparent that the structure as just described provides a resilient support for the seat 11 upon the platform 2, and that the movements of the seat are rectilinear as determined by the guiding action of the section 7 of the snubber or shock absorber 6 within the pillar 16. The details of the shock absorber 6 form no part of the present invention, but it is intended that such element shall comprise a shock absorber of well known design and construction, preferably of the hydraulic type and including instrumentalities for limitation of the upward movement of the seat assembly, and also controlling the rate of movement of the seat assembly from its lower-most position to the upward limit of movement. In this manner the spring 15 is constantly maintained under a desirable amount of compression so that the desired resiliency in support of the seat assembly is provided. As just indicated the shock absorber comprises an element of the novel combination of the present invention, but, as to details, this element may assume various forms. It may for example assume the form shown in Nickelsen Patent No. 2,004,380, issued June 11, 1935.

When the support mechanism, as above described, is in use, the weight of the person upon the seat 11 will cause downward movement of the seat assembly and a certain amount of compression of the spring 15, depending upon the weight of the person. If the vehicle upon which the mechanism is mounted moves suddenly upward, further compression of the spring results until a condition of equilibrium obtains. There is then, however, tendency for the spring 15 to recoil and to move the seat 11, and associated elements, rapidly upward. Such action is, however, prevented by the snubber action of the shock absorber 6 to which the seat is attached. In this manner undesirable recoil is prevented and a maximum of comfort and safety are provided for the occupant of the seat.

As already indicated the spring 15 is under compression when supporting the weight of a person upon the seat 11. If the vehicle, including the frame 1 and the platform 2, is caused to move suddenly downwardly there is, of course, a tendency for the seat to move rapidly upwardly relative to the vehicle. Such movement is again prevented by the absorber mechanism 6 and the cooperation of this mechanism and the spring thereafter causes desirable movement of the seat to a position of equilibrium after the movements of the vehicle have become stabilized.

The embodiment of the invention as shown in Fig. 2 eliminates the guide pillar 16. In its stead there is provided a hinged member or seat frame 20 pivoted at 21 upon the frame 1 of the vehicle upon which the device is used. The seat 11' is mounted on the rear end of the seat frame which has a downward extension 22 which is pivotally attached at 23 to the upper end of the telescopic member 7 of the shock absorber or snubber 6. The seat frame 20, 22 is thus supported by spaced supports on the vehicle indicated at 9 and 21. A third support on the vehicle is disposed above the rear support 9 being in the form of the platform 2 which supports the spring construction. The member 7 of this embodiment has a flanged portion 13' which provides a recess 14' to receive the upper end of the spring 15'. The opposite end of this spring rests within an annular flange 24 upon supporting disk 25 secured to the platform 2 about the opening 5 by means of bolts 26.

It is to be noted that in this form of the invention pivot connections must be provided at 21, 23 and 9 in order that necessary relative movement of the component parts of the structure is had. Except for this feature in the operational characteristics of the construction, the operation of the embodiment of Fig. 2 is the same as that hereinbefore described.

Broadly the invention comprehends a resilient seat support for vehicles which is so constructed and arranged as to provide a maximum of comfort and safety to the user of the vehicle.

What is claimed is:

1. A support mechanism for the driver's seat of a vehicle comprising in combination, a support, a seat assembly including a hinged member on the support, a seat thereon at a point spaced from the pivot for said member, means on the nether side of said hinged member forming a downwardly facing recess, a coil spring interposed between the member and support and having its upper end fitting within said recess for resiliently supporting the hinged assembly, and additional means interposed between and connected to each said support and assembly for controlling the recoil movement of the seat, said last mentioned means comprising a hydraulic shock absorber having its lower end pivotally connected to said support.

2. A support mechanism for the driver's seat of a vehicle comprising in combination, a support, a seat assembly including a hinged member on the support, a seat thereon at a point spaced from the pivot for said member, means comprising a compression spring interposed between the member and support for resiliently supporting the hinged assembly, and additional means interposed between and connected to each said support and assembly for controlling the recoil movement of the seat, said last mentioned means comprising a hydraulic shock absorber located within said spring and pivotally connected to each said support and said assembly.

3. A cushioned seat structure comprising a vehicle seat mounted on the rear end of a frame, a pair of spaced supports on the vehicle for said seat frame, one of said supports being disposed substantially forwardly of said seat, said one of said supports including a pivot connected to the forward end of said frame, a pivoted disc mounted on said seat frame beneath said seat, a downwardly extending flange on said disc, a coil spring having its upper end supporting said disc and disposed within said flange, the lower end of said spring being disposed on the rear vehicle support below said seat, said coil spring and disc comprised in a snubber construction to prevent rebound of said seat frame with respect to the vehicle supports, and a pivoted connection between said snubber construction and a third support on the vehicle.

4. A supported seat assembly for a vehicle comprising in combination, a support, a seat, a mounting for said seat, a pivotal connection for vertical pivotal movement between said seat and said mounting, a coil spring interposed between said mounting and said support, a forward extension on said seat, a pivotal connection for vertical pivotal movement between the end of said extension remote from the seat and said support, and a hydraulic shock absorber assembly connected between said seat and said support.

5. A supported seat assembly for a vehicle comprising in combination, a support, a seat, a mounting for said seat, a pivotal connection for vertical pivotal movement between said seat and said mounting, a coil spring interposed between said mounting and said support, a forward extension on said seat, a pivotal connection for vertical pivotal movement between the end of said extension remote from the seat and said support, and a hydraulic shock absorber assembly concentric with said coil spring connected between said seat and said support.

JOHN RANDOLPH.

REFERENCES CITED

The following references are of record in the file of this patent:

UNITED STATES PATENTS

| Number | Name | Date |
|---|---|---|
| 522,387 | Pederson | July 3, 1894 |
| 666,802 | Ford | Jan. 29, 1901 |
| 766,981 | Anderson | Aug. 9, 1904 |
| 998,814 | Turton | July 25, 1911 |
| 1,174,429 | McCrea | Mar. 7, 1916 |
| 1,229,488 | Lindskoog | June 12, 1917 |
| 1,248,671 | Kelly | Dec. 4, 1917 |
| 1,288,216 | Saylee | Dec. 17, 1918 |
| 1,531,938 | Hiden, Jr. | Mar. 31, 1925 |
| 1,663,112 | Caslow | Mar. 20, 1928 |
| 1,839,306 | Flentje | Jan. 5, 1932 |
| 2,041,154 | Slutz | May 19, 1936 |

FOREIGN PATENTS

| Number | Country | Date |
|---|---|---|
| 299,207 | Great Britain | of 1928 |